Dec. 30, 1952 W. F. HEINISCH 2,623,543
DIAPHRAGM OPERATED VALVE WITH FRICTIONLESS
SEAL BETWEEN DIAPHRAGM MECHANISM AND VALVE
Filed July 18, 1949
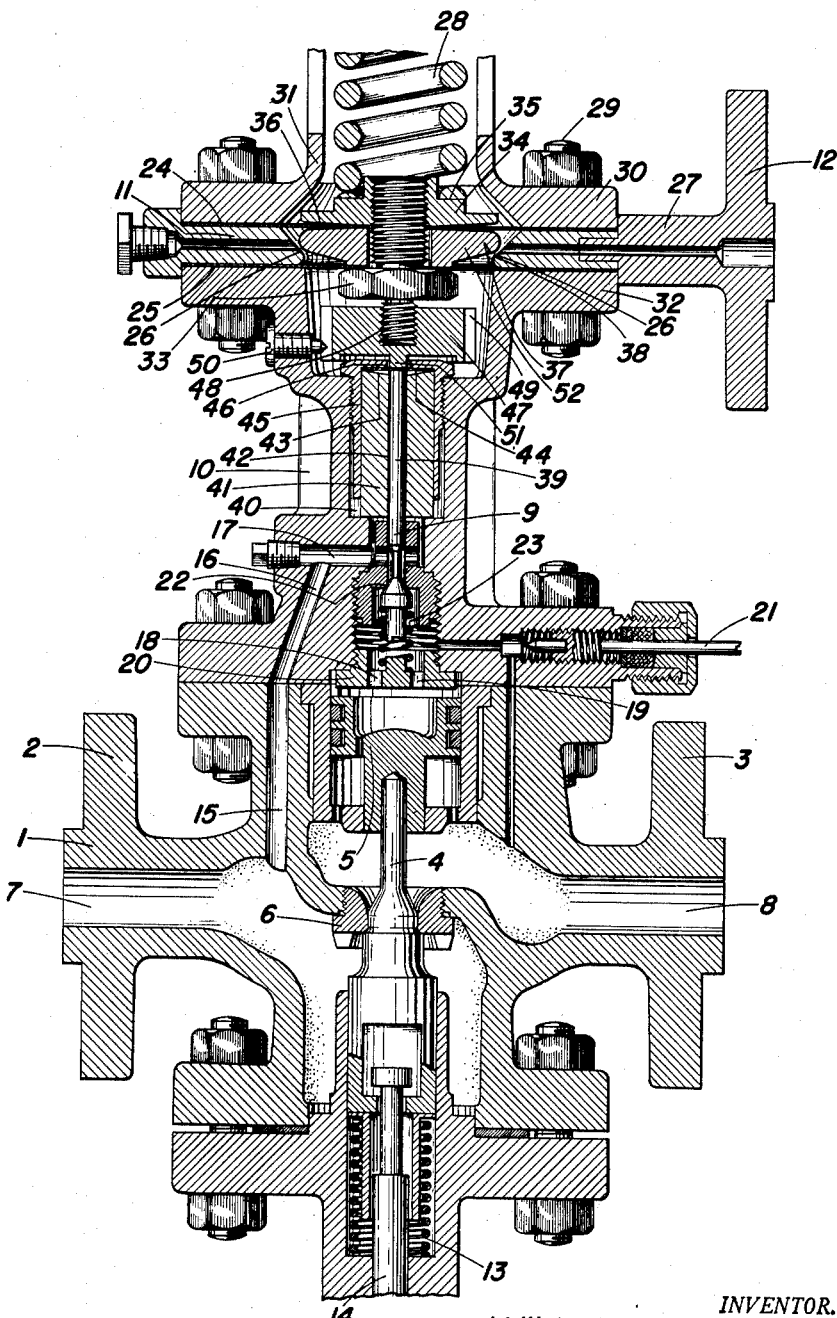
INVENTOR.
WILLIAM F. HEINISCH
BY
ATTORNEY Patented Dec. 30, 1952

2,623,543

UNITED STATES PATENT OFFICE 2,623,543

DIAPHRAGM OPERATED VALVE WITH FRICTIONLESS SEAL BETWEEN DIAPHRAGM MECHANISM AND VALVE

William F. Heinisch, Bremerton, Wash.

Application July 18, 1949, Serial No. 105,436

1 Claim. (Cl. 137—688)

(Granted under the act of March 3, 1883, as amended April 30, 1928; 370 O. G. 757)

This invention relates to improvements in control devices and more particularly to improvements in pressure responsive governors.

Control devices of the type with which this invention is concerned include diaphragm mechanisms and include reciprocable members of the type wherein the one end of such a member must be in force-transmitting relation with an element which is located in a region that must be substantially sealed from the region in which the other end of the member is located. In prior art devices the diaphragms of the diaphragm mechanisms are frequently permanently deformed or actually fractured by the action of a loading device. Also, in prior art devices the means for sealing the regions from each other are unsatisfactory in that if a packed gland type of seal is used around the reciprocable member it impedes the motion of the member if it is tight enough to prevent leakage; whereas, if a metal bellows type of seal over the end of the member is used it fails early when under high pressure and marine service. Prior art devices are further characterized by awkward and space consuming elements and by imperfectly guided moving elements.

Objects of this invention, therefore, are to provide improvements in control devices of the character described whereby excessive stressing of diaphragms is prevented, whereby diaphragms are precluded from flexing over sharp edged surfaces, and whereby the region adjacent one end of a reciprocable member is sealed from the region adjacent an element in force-transmitting relation with the opposite end of said member in a manner which will not impede reciprocation of the member, but which will be pressure-tight; to provide stop means for preventing excessive flexure of diaphragms under the action of a loading device, while permitting the device to load the diaphragm mechanism to any desired degree; to provide appropriately constructed means for causing the diaphragms to flex over relatively gradual curves; to provide pressure-tight and conveniently arranged means for sealing one region from another in such a manner as to facilitate frictionless force or motion transfer between parts located in the two regions; and to provide means for accurately guiding moving elements.

In accomplishing these and other objects of the present invention, I have provided improved details of structure, the preferred form of which is illustrated in the accompanying drawings, wherein:

The figure is a longitudinal cross section of a pressure responsive governor embodying the features of the present invention.

Referring more particularly to the drawing:

Numeral 1 indicates the body of a governor of the type used particularly in marine steam service. The body 1 is provided with a flange 2 for connecting the input side of the governor to a source of steam, not shown, and with a flange 3 for connecting the output side of the governor to a steam turbine or similar prime mover. Controlling the main flow of steam through the governor is a valve 4 operated by a piston 5. The valve 4 closes against a seat ring 6, thus effectively shutting off the main passage of steam from input channel 7 to output channel 8. An auxiliary valve 9 lodged in an auxiliary valve top 10 is provided for automatically controlling the operation of the main valve 4. The action of auxiliary valve 9 is controlled by a differential diaphragm mechanism including a generally annular member 11 constituting the body of a pressure chamber which operates in response to the pressure of, for example, a pump, not shown, driven by the aforementioned turbine. The discharge of the pump is connected to the flange 12.

The detailed construction of the various elements of the device will now be considered. The main valve 4 is biased toward closed position by means of a spring 13 and is capable of being manually operated, if desired, by the action of a hand wheel, not shown, drawing downward on the stem 14 against the action of the spring 13. Under automatic operation, the main valve 4 is actuated by steam flowing from the inlet pasage 7 through the bore 15 in the body 1, thence through the bores 16 and 17 in the valve top 10, past the auxiliary valve 9 (assumed open), through the ports 18 and 19 in the auxiliary valve bottom plug 20, and thence onto the piston 5. For adjusting the flow of steam to the piston 5, a needle valve 21 is provided. The auxiliary valve 9 is normally biased towards a closed position against the auxiliary valve seat 22 by means of a spring 23.

The differential type diaphragm mechanism for actuating the valve 9 includes an upper diaphragm 24 and a lower diaphragm 25, each preferably of flexible resilient steel and fixed on opposite sides to the pressure chamber formed by ring 11. The diaphragm 24 has a larger effective area than the diaphragm 25 by virtue of the tapered cross section indicated at 26 of the pressure chamber. The diaphragm mechanism is actuated in response to the pressure of a fluid medium conveyed as from an oil pump connected to flange 12 through the nipple 27 to the inside of the pressure chamber. The differential diaphragm mechanism acts against the force of an adjusting spring 28 fixed in assembled relation to the diaphragm mechanism by means of bolts 29 passing through flange 30 on the upper dome-like chamber 31 (shown partly broken away), annular member 11, and through flange 32 of the auxiliary valve top 10. The compression of the spring 28 is controlled in a known manner by a hand wheel, not shown, to determine the point of operation of the differential diaphragm mechanism. The diaphragms 24 and 25 are clamped together against a diaphragm spacer 52 by means of a diaphragm screw 33 and a threaded washer 34. The threaded washer 34 is provided with a stepped portion 35 to receive the lower end of spring 28 for transmitting the spring force to the diaphragms, and is provided with a gently curved surface 36 over which the diaphragm 24 may flex. Downward motion of the diaphragms under the action of the spring 28 is limited by the projecting portion 37 of the spacer 52 abutting the surface 38 of the annular member 11.

Since the condition of the diaphragm mechanism is to be used to determine the position of the auxiliary valve 9, means are provided to transmit the net result of the fluid pressure within the diaphragm chamber and the pressure of the spring 28 to the free end of the stem 39 of the valve 9. Since the valve 9 lies generally within a region subject to the relatively high steam pressure existing in the bore 17, while the differential diaphragm mechanism lies generally within a region of relatively low (atmospheric) air pressure, it is apparent that the transmission of force or motion between these two parts must be accomplished in a manner which will prevent leakage of steam from the region surrounding the valve to the region adjacent the diaphragm mechanism. This end is attained in the following manner. In a cavity 40 of the valve top 10, within which lies the stem 39 of the valve 9, is placed a top plug insert 41. The insert 41 is in the form of a relatively thick walled metal cylinder having a central cylindrical opening 42 closely surrounding and serving as a guide for the valve stem 39. Insert 41 provides a long guiding surface for stem 39, preventing cocking of the latter and insuring proper seating of the valve 9. The insert 41 is dished at its upper end as indicated by the numeral 43 to allow for the flexing of a flexible, preferably resilient, metallic disk or diaphragm 44 clamped around its perimeter by means of an auxiliary valve top plug 45 threadedly engaged within the cavity 40 to form a fluid tight seal against the end of the insert 41. The plug 45 also serves to force insert 41 into fluid-tight engagement with the lower surface of cavity 40. The top plug 45 is provided with a substantially central opening 46 in the top thereof affording access to the top of the disk 44. This arrangement of elements 41, 44 and 45 effectively establishes a pressure tight seal between the relatively low pressure region adjacent the differential diaphragm mechanism, while nevertheless affording force transmitting relationship between these two parts through the opening 46. To impose its restraints on the valve 9, the differential diaphragm mechanism is provided with an auxiliary valve adjusting screw nut 47 threadedly engaged with a projection 48 on the head portion of the diaphragm screw 33. The nut 47 is provided with teeth 49 around its circumference which cooperate with a set screw 50 to retain the nut in any position of rotational adjustment on the screw 33, while permitting reciprocation of the nut with the screw. The nut 47 is further provided with a projection 51 adapted to control the position of the end of the stem 39 of the valve 9 by bearing against it through the diaphragm 44. The diaphragm 44 thus in effect constitutes substantially a frictionless stuffing box around the valve stem 39.

Operation

The device, with improvements in which this invention is concerned, can be used in various systems, but is particularly adaptable to the system about to be described by way of example. Assume an oil pump to be driven by a steam turbine, the pump being used to supply a variable output such as, for example, a plurality of oil burner nozzles, any one of which may upon occasion be shut off. Assume further that it is desirable to maintain a substantially constant pressure on the nozzles i. e. with the pump output pressure independent of the load on the pump i. e. the number of nozzles operating at a given time. The governor valve illustrated is connected by means of flange 2 to the main steam source such as a boiler. The turbine is connected to the flange 3. The flange 12 is connected to a point where the pressure has stabilized on the discharge side of the oil pump driven by the turbine.

When first cutting the governor into service, it is opened wide by means of manually operated stem 14 while the pump is controlled by a hand throttle valve provided on it. This allows the steam line to clear properly. The spring 28 is now compressed somewhat and the needle valve 21 is closed. The manually controlled stem 14 is now released, restoring the governor to automatic operation. The spring 28 is compressed until the desired pump discharge pressure is obtained. The needle valve 21 is now backed out slightly until the desired characteristic rise in discharge pressure is obtained from rated capacity of the pump to the shut off point, which may be a difference of about 20 or 30 pounds per square inch. With the pump operating at rated capacity, its discharge pressure is communicated to the differential diaphragm mechanism and produces a net upward thrust therein by virtue of the larger effective area of the diaphragm 24. This thrust is opposed by the compression of the spring 28. When the discharge pressure is below that for which the governor valve is set, the spring 28 deflects the diaphragms 24 and 25 downward. This motion is transmitted by the projection 51 through the disk 44, which is thus flexed toward the dished surface 43 to open the auxiliary valve 9. Opening of the auxiliary valve 9 admits steam to the top of the piston 5 via the inlet channel 7, bores 15, 16 and 17 and ports 18 and 19. This opens the main valve 4, allowing more steam to flow to the pump. When the discharge pressure returns to that for which the governor is adjusted, the diaphragms 24 and 25 deflect upward, assuming the position shown in the drawing. This movement allows the auxiliary valve 9 to seat under the action of the spring 23, thus cutting off the supply of steam to the piston 5. The main valve 4 then returns to its seat under the action of the spring 13.

The most advantageous working position of the diaphragm mechanism may vary under different circumstances. In general this will be found to be that position in which the internal diaphragm stresses due to flexure are either at a minimum or are always exerted in one direction. As these forces, in conjunction with the forces of the adjusting spring 28, have considerable effect upon the operating characteristics, the final diaphragm height adjustment is preferably made while the governor is operating in its most efficient position, which position may vary slightly from one pump system to another. The height of the working position of the diaphragm mechanism is adjusted by loosening the set screw 50 and turning the adjusting screw nut 47 one notch at a time until the best operation is secured. The set screw 50 is then tightened, care being taken that its point engages a notch between two teeth 49, and that it does not strike one of the teeth. This adjustment should be made with the full discharge pressure existing between the diaphragms 24 and 25.

The abutting of the projection 37 of the spacer 52 on the surface 38 of the annular member 11 serves to prevent excessive distortion of the diaphragms 24 and 25 which might occur under the action of spring 28, while at the same time allowing any desired compression to be imposed upon the spring 28 to determine the point of operation of the governor. Thus the diaphragms 24 and 25, which are required to operate only under the relatively small net difference in force between the force of the spring 28 and the force of the fluid in the diaphragm chamber, are protected from sustaining a deleterious permanent deformation under the influence of the spring 28 during a condition when the net force on the diaphragm mechanism may actually be the force of the spring 28, since the fluid pressure within the diaphragms may have dropped so much that the difference between it and the force of the spring 28 approaches the value of the force of the spring 28. The diaphragm 24 is further protected from permanent deformation or rupture common in prior art devices by the provision of the gently curved surface 36 of the washer 34 over which the diaphragm 24 flexes in the course of normal operation. In prior art devices the washer 34 usually had a sharp edge at the point of contact of the washer with the diaphragm 24, causing undesired flexure of the diaphragm over an extremely short radius.

While I have shown but one embodiment of my invention, it is apparent that the device is susceptible to modification without departing from the spirit of the invention. I do not wish, therefore, to be limited by the disclosures set forth, but only by the scope of the appended claim.

The invention described herein may be manufactured and used by or for the Government of the United States of America for governmental purposes without the payment of any royalties thereon or therefor.

What is claimed is:

A device of the character described comprising a valve having a stem and a disk, means biasing said valve into closed position, a valve top having a cylindrical cavity surrounding said stem, the wall of said cavity having a threaded portion adjacent the outer end of said stem, a relatively thick-walled cylindrical insert in said cavity having a longitudinal cylindrical opening therethrough closely surrounding said stem, said insert having the end thereof dished which is adjacent the outer end of said stem, a resilient disk disposed on the dished end of said insert and forming, when undistorted, a substantially plane cap for said dished end, the outer end of said stem being just in contact with said disk when said valve is closed and said disk is plane, a top plug threadedly engaging said threaded portion of said cavity and clamping said disk circumferentially against said insert to form a pressure-tight seal across the end of said cavity adjacent the outer end of said stem, a differential diaphragm mechanism including a pair of diaphragms clamped in a pressure-tight manner circumferentially, one on each of the opposite sides of an annular member, to constitute a pressure chamber, said annular member being so tapered in cross-section as to provide different effective areas for said diaphragms, a substantially central opening through each of said diaphragms, a screw extending through said central openings, a portion of said screw being adapted to engage the outside of the effectively smaller of said diaphragms, a spacer surrounding said screw between said diaphragms, said spacer being so constructed as to engage said annular member to limit motion of said diaphragms, a washer threaded on said screw to bear against the outside of the effectively larger of said diaphragms, the surface of said washer adapted to contact said diaphragm being gently tapered toward its periphery away from said diaphragm when said diaphragm is in its substantially plane, unflexed condition, said washer and said screw serving to clamp said diaphragms together against said spacer, means engaging said washer to load said diaphragm mechanism, and means on the head portion of said screw adapted to engage said resilient disk to transmit force and motion through said disk between said screw and said valve stem.

WILLIAM F. HEINISCH.

REFERENCES CITED

The following references are of record in the file of this patent:

UNITED STATES PATENTS

| Number | Name | Date |
|---|---|---|
| 1,473,173 | Brinkerhoff | Nov. 6, 1923 |
| 2,232,914 | Hewitt | Feb. 25, 1941 |
| 2,367,624 | Sekera | Jan. 16, 1945 |
| 2,382,235 | Larmar | Aug. 14, 1945 |
| 2,388,026 | Ward | Oct. 30, 1945 |

FOREIGN PATENTS

| Number | Country | Date |
|---|---|---|
| 879,571 | France | of 1942 |